United States Patent
Kim et al.

(10) Patent No.: US 12,262,205 B2
(45) Date of Patent: Mar. 25, 2025

(54) METHOD AND APPARATUS FOR UPDATING SECURITY CONFIGURATION IN NEXT-GENERATION WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 17/573,468

(22) Filed: Jan. 11, 2022

(65) Prior Publication Data

US 2022/0225099 A1 Jul. 14, 2022

(30) Foreign Application Priority Data

Jan. 11, 2021 (KR) .................. 10-2021-0003343
Jan. 28, 2021 (KR) .................. 10-2021-0012340

(51) Int. Cl.
*H04W 12/10* (2021.01)
*H04W 12/50* (2021.01)
(Continued)

(52) U.S. Cl.
CPC ........... *H04W 12/10* (2013.01); *H04W 12/50* (2021.01); *H04W 12/69* (2021.01); *H04W 76/19* (2018.02); *H04W 80/02* (2013.01)

(58) Field of Classification Search
CPC ..... H04W 12/10; H04W 12/50; H04W 12/69; H04W 76/19; H04W 80/02; H04W 12/35; H04W 12/37
See application file for complete search history.

(56) References Cited

U.S. PATENT DOCUMENTS

2020/0084618 A1 3/2020 Teyeb et al.
2024/0276287 A1* 8/2024 Wang ............... H04W 28/0242

FOREIGN PATENT DOCUMENTS

CN 114402661 B * 3/2024
KR 10-2020-0068458 A 6/2020
WO 2019139518 A1 7/2019

OTHER PUBLICATIONS

Supplementary European Search Report dated Mar. 20, 2024, in connection with European Patent Application No. 22736930.3, 10 pages.

(Continued)

*Primary Examiner* — Charles N Appiah
*Assistant Examiner* — Frank E Donado

(57) ABSTRACT

The disclosure relates to a 5G or 6G communication system for supporting higher data rates after a 4G communication system such as LTE. A data transmission/reception method of a UE in a wireless communication system supporting integrated access and backhaul (IAB) communication, includes performing security processing based on security configuration for a packet data convergence protocol (PDCP) layer when transmitting and receiving data to and from an IAB node; receiving a first control message including security configuration information from the IAB node; updating the security configuration for the PDCP layer based on the security configuration information; and performing security processing on the data transmitted and received to and from the IAB node based on the updated security configuration.

16 Claims, 13 Drawing Sheets

(51) Int. Cl.
*H04W 12/69* (2021.01)
*H04W 76/19* (2018.01)
*H04W 80/02* (2009.01)

(56) References Cited

OTHER PUBLICATIONS

International Search Report and Written Opinion of the International Searching Authority dated Mar. 25, 2022, in connection with International Application No. PCT/KR2022/000470, 8 pages.
AT&T, "Principles of Group Mobility for Inter-donor IAB-node Migration," R3-206332, 3GPP TSG-RAN WG3 Meeting #110-e, Online, Nov. 2-12, 2020, 5 pages.
Fujitsu, "Discussion on inter-donor IAB migration," R3-206107, 3GPP TSG-RAN WG3 #110-e, Online, Nov. 2-12, 2020, 8 pages.
Google, "Discussion on Inter-donor migration," R3-206292, 3GPP TSG-RAN WG3 Meeting #110-E, Online, Nov. 2-12, 2020, 6 pages.
Huawei, "Inter-CU migration procedure," R3-206665, 3GPP TSG-RAN WG3 meeting #110-e, E-meeting, Nov. 2-12, 2020, 6 pages.

* cited by examiner

FIG. 7
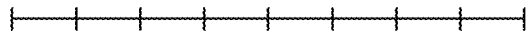
(a)
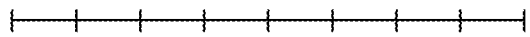
(b)
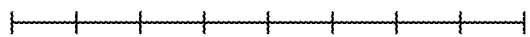
(c)

METHOD AND APPARATUS FOR UPDATING SECURITY CONFIGURATION IN NEXT-GENERATION WIRELESS COMMUNICATION SYSTEM

CROSS-REFERENCE TO RELATED APPLICATIONS

This application is based on and claims priority under 35 U.S.C. § 119(a) of a Korean patent application number 10-2021-0003343 filed on Jan. 11, 2021, in the Korean Intellectual Property Office, and of a Korean patent application number 10-2021-0012340, filed on Jan. 28, 2021, in the Korean Intellectual Property Office, the disclosure of each of which is incorporated by reference herein in its entirety.

BACKGROUND

1. Field

The disclosure relates to a method and an apparatus for updating security configuration in a mobile integrated access and backhaul (IAB) scenario of a next-generation mobile communication system.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems may be connected to communication networks. Examples of things connected to networks may include vehicles, robots, drones, home appliances, displays, smart sensors connected to various infrastructures, construction machines, and factory equipment. Mobile devices are expected to evolve in various form factors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as Beyond-5G systems.

6G communication systems, which are expected to be implemented approximately by 2030, may have a maximum transmission rate of tera (1,000 giga)-level bps and a radio latency of 100 μsec, and thus may be 50 times as fast as 5G communication systems and have the ¹/₁₀ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) may become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like).

In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems may enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response may be provided through 6G communication systems, and thus these services may be applied to various fields including industrial, medical, automobile, and home appliance fields.

Integrated access and backhaul (IAB) is a type of wireless backhaul construction technology for wireless connecting adjacent base stations by using an NR wireless communication technology. There has been ongoing development of various technologies capable of stably providing wireless communication in connection with IAB.

The above information is presented as background information only to assist with an understanding of the disclosure. No determination has been made, and no assertion is made, as to whether any of the above might be applicable as prior art with regard to the disclosure.

SUMMARY

Various methods have been conceived such that, when a UE needs to update security configuration in a mobile IAB scenario which has endowed an IAB node with mobility, the same is performed.

A data transmission/reception method of a UE in a wireless communication system supporting integrated access and backhaul (IAB) communication according to an embodiment of the disclosure may include performing security processing based on security configuration for a packet data convergence protocol (PDCP) layer when transmitting and receiving data to and from an IAB node, receiving a first control message including security configuration information from the IAB node, updating the security configuration for the PDCP layer based on the security configuration information, and performing security processing on the data transmitted and received to and from the IAB node based on the updated security configuration.

A data transmission/reception method of an IAB node in a wireless communication system supporting IAB communication according to an embodiment of the disclosure may include transmitting and receiving security-processed data to and from a UE based on security configuration for a PDCP layer, transmitting a first control message including security configuration information to the UE, and transmitting/receiving the security-processed data to and from the UE using updated security configuration based on the security configuration information.

A UE in a wireless communication system supporting IAB communication according to an embodiment of the disclosure may include a transceiver and a controller configured to control to perform security processing based on security configuration for a PDCP layer when data is transmitted and received to and from an IAB node, receive a first control message including security configuration information from the IAB node, update the security configuration for the PDCP layer based on the security configuration information, and perform security processing on the data transmitted and received to and from the IAB node based on the updated security configuration.

An IAB node in a wireless communication system supporting IAB communication according to an embodiment of the disclosure may include a transceiver and a controller configured to control to transmit and receive security-processed data to and from a UE based on security configuration for a PDCP layer, transmit a first control message including security configuration information to the UE, and transmit/receive the security-processed data to and from the UE using updated security configuration based on the security configuration information.

According to the technology disclosed herein, the occurrence of errors regarding communication between a UE and a base station may be prevented while security configuration is updated, and efficient update processing may be performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating the format of a PDCP control packet according to an embodiment of the present disclosure;

DETAILED DESCRIPTION

Figure 1:
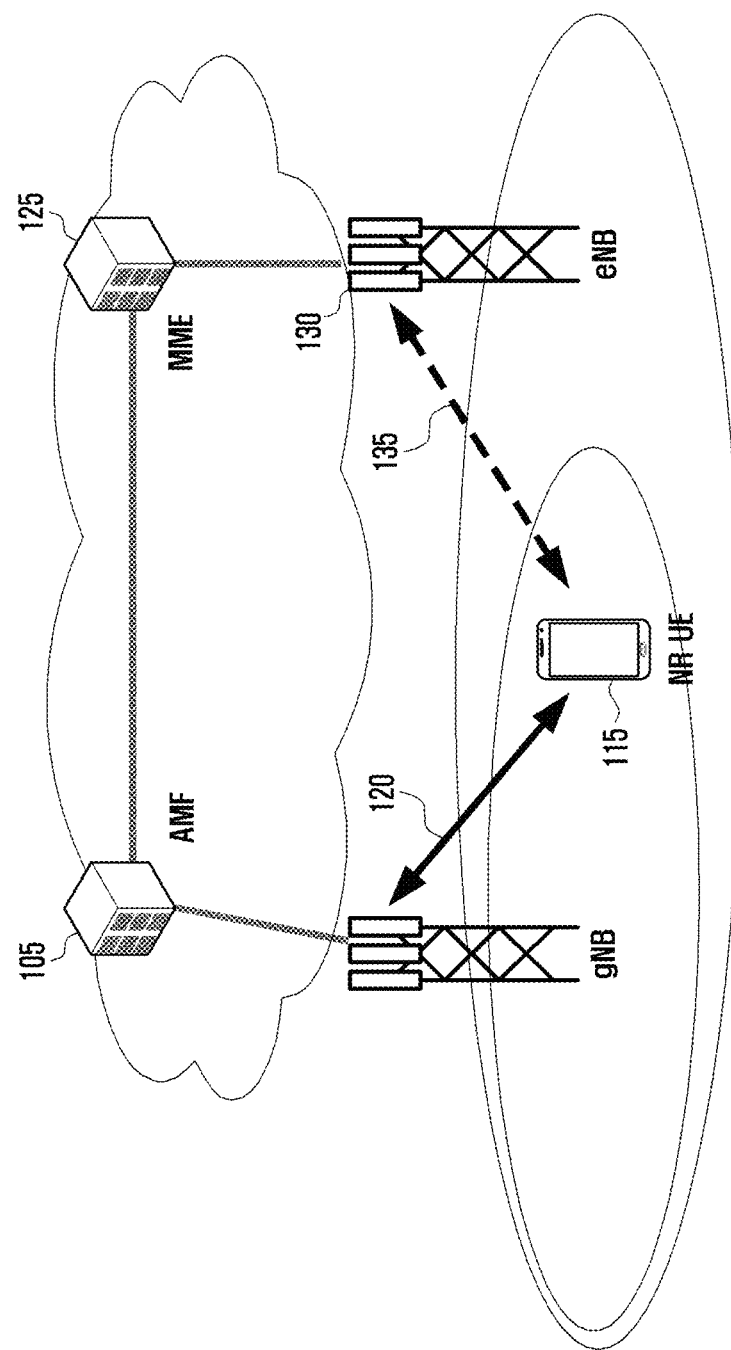
FIG. 1 is a diagram illustrating a structure of a new radio (NR) mobile communication system according to an embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

The following detailed description of embodiments of the disclosure is directed to 5G mobile communication technologies, but based on determinations by those skilled in the art, the main idea of the disclosure may be applied to other communication systems having similar backgrounds through some modifications without significantly departing from the scope of the disclosure In the following description, some of terms and names defined in the 3rd generation partnership project long term evolution (3GPP LTE) standards (standards for 5G, NR, LTE, or similar systems) may be used for the convenience of description. However, the disclosure is not limited by these terms and names, and may be applied in the same way to systems that conform other standards.

In the following description, terms referring to signals, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

In the following description, a physical channel and a signal may be used interchangeably with data or a control signal. For example, although a physical downlink shared channel (PDSCH) is a term that refers to a physical channel through which data is transmitted, the PDSCH may also be used to refer to data. That is, in the disclosure, the expression "transmitting a physical channel" may be interpreted equivalently to the expression "transmitting data or a signal through a physical channel."

Hereinafter, in the disclosure, upper signaling refers to a signal transmission method in which a signal is transmitted from a base station to a terminal using a downlink data channel of a physical layer or from a terminal to a base station using an uplink data channel of a physical layer. The upper signaling may be understood as radio resource control (RRC) signaling or media access control (MAC) control element (CE).

In addition, in the disclosure, in order to determine whether a specific condition is satisfied or fulfilled, an expression of more than or less than is used, but this is only a description to express an example, and a description of more than or equal to or less than or equal to is not excluded. A condition described as "more than or equal to" may be replaced with "more than," a condition described as "less than or equal to" may be replaced with "less than," and a condition described as "more than or equal to and less than" may be replaced with "more than and less than or equal to."

FIG. 1 is a diagram illustrating a structure of a new-generation mobile communication system according to an embodiment of the present disclosure.

Referring to FIG. 1, a radio access network of a new-generation (new radio, NR) mobile communication system may be constituted of a new-generation base station (new radio node B, hereinafter, referred to as "gNB") 110 and an AMF (new radio core network) 105. A user terminal (new radio user equipment, hereinafter "NR UE" or "terminal") 115 may access an external network through the gNB 110 and the AMF 105.

In FIG. 1, the gNB corresponds to an evolved Node B (eNB) of an existing LTE system. The gNB may be connected to the NR UE through a radio channel and can provide a service superior to that of the existing node B in 120. In the NR mobile communication system, since all user traffic is serviced through a shared channel, a device for collecting and scheduling status information such as buffer statuses of UEs, an available transmission power status, or a channel status, and the gNB 110 is responsible for this. One gNB typically controls multiple cells.

In order to implement ultra-high-speed data transmission compared to the existing LTE, beamforming technology can be additionally grafted by using orthogonal frequency division multiplexing (hereinafter, referred to as "OFDM") as a radio access technology while having more than the existing maximum bandwidth. In addition, an adaptive modulation & coding (hereinafter, referred to as "AMC") method that determines a modulation scheme and a channel coding rate according to the channel state of a terminal is applied. The AMF 105 performs functions such as mobility support, bearer configuration, QoS configuration, and the like. The AMF is a device in charge of various control functions as well as a mobility management function for a terminal, and is connected to a plurality of base stations. In addition, the NR mobile communication system can be linked with the existing LTE system, and the AMF is connected to an MME 125 through a network interface. The MME is connected to an eNB 130 which is the existing base station. A terminal supporting LTE-NR dual connectivity may transmit/receive data in 135 while maintaining a connection to not only the gNB but also the eNB.

Figure 2:
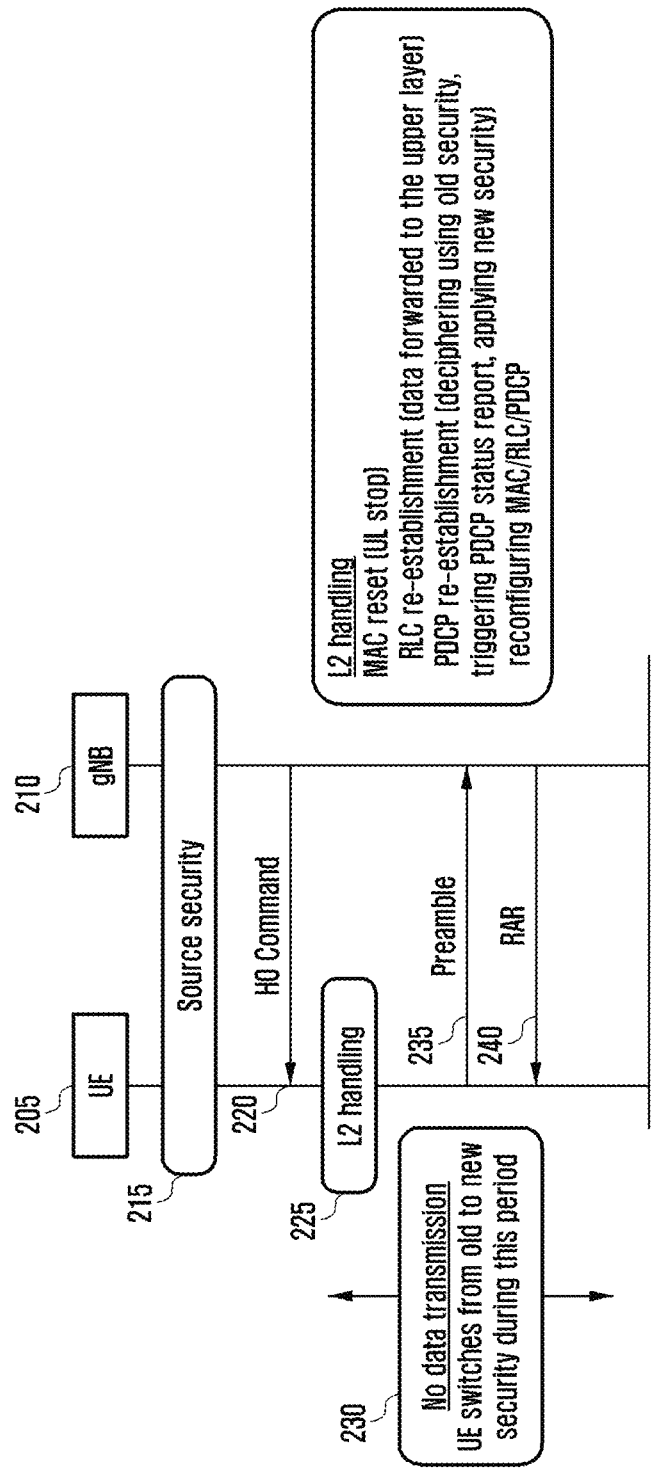
FIG. 2 is a flowchart illustrating a handover operation according to an embodiment of the present disclosure.

FIG. 2 is a flowchart illustrating a handover operation according to an embodiment of the present disclosure.

A handover operation is normally performed when a user equipment (UE) 205 in a connected mode changes a serving cell for a base station 210. In a typical handover operation, a UE performs random access, and through the random access process, the UE may adjust an uplink transmission timing and may determine a time point at which reconfiguration information is applied. Another purpose of performing a handover is to update security configuration. A predetermined key, a serial number, and a counter value are used while a security process for each packet, for example, ciphering and integrity protection, is performed in a packet data convergence protocol (PDCP) layer in 215.

The ciphering process refers to encrypting a packet so that no one can decode and interpret the packet, and the integrity protection process refers to encrypting a packet to determine whether original information of the packet has been changed. At this time, when security configuration information such as a security algorithm is changed or a running counter is wrapped around, the security configuration is required to be updated. In this case, the base station 210 may configure (transmit a handover command) a handover to the UE 205 that needs to update the security configuration in 220, and the UE performs a handover to a current serving cell to update the security configuration.

The UE performing the configured handover performs the following operations related to Layer-2 (L2) along with random access in 225, and the UE and the base station stop the data transmission/reception operation in 230 until the handover is successfully completed:

MAC reset;
RLC/PDCP re-establishment; and/or
MAC/RLC/PDCP reconfiguration.

The UE in which the handover is triggered transmits a preamble to the base station in 235, and receives a random access response (RAR) in 240. A new security configuration may be applied to data transmitted and received after RAR.

Figure 3:
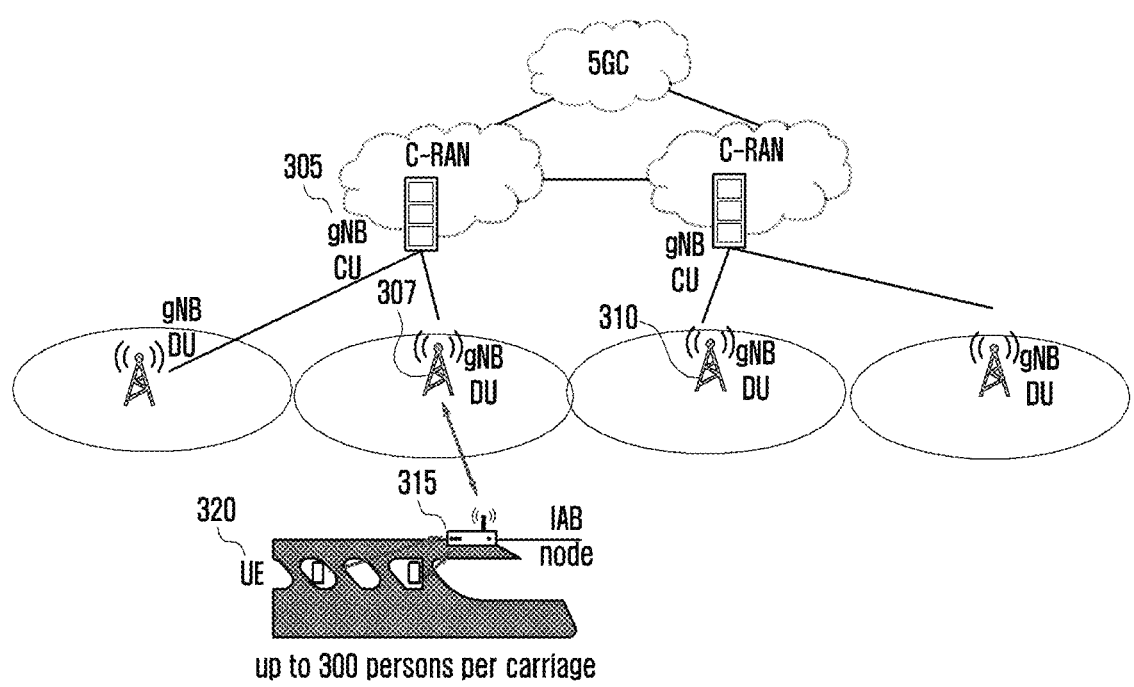
FIG. 3 is a diagram illustrating the concept of a mobile IAB node according to an embodiment of the present disclosure.

FIG. 3 is a diagram illustrating the concept of a mobile IAB node according to an embodiment of the present disclosure.

Conventional base stations and network devices (NW entities) are connected to each other through a wired backhaul such as an optical cable to transmit and receive necessary information. Integrated access and backhaul (IAB) is a kind of wireless backhaul construction technology that wirelessly connects adjacent base stations using NR wireless communication technology. The IAB technology enables mobile communication operators to expand their service areas without establishing a wired backhaul that needs a lot of cost and effort.

A base station connected to a network in a wired manner is called an IAB-donor, and may be divided into a CU 305 and a DU 307 in terms of its function. A center unit (CU) is composed of upper layers above PDCP, and a distributed unit (DU) is composed of layers below RLC. The IAB-donor is connected to a neighboring base station through NR radio technology. The neighboring base station is called an IAB node 320, and is also wirelessly connected between IAB nodes, so that an indirect connection with the IAB-donor is also possible.

In this case, when data transmission/reception is performed between the IAB-donor and the IAB node through several IAB nodes, a virtual CU-DU relationship is formed between the IAB-donor and the IAB node. In other words, an F1 interface is configured between the two nodes. Since the IAB-donor and the IAB node are originally base stations, the IAB-donor and the IAB node provide data transmission/reception services to UEs belonging to their service area. For example, one IAB node may transmit/receive data of UEs located in its service area to an IAB-donor via a wirelessly connected adjacent IAB node, thereby providing a service to the UE.

In various embodiments of the disclosure, a mobile IAB scenario in which mobility is granted to an IAB node is considered. In the above scenario, the IAB node 320 may move, and may change an IAB-donor wirelessly connected to the IAB node itself or an adjacent IAB node to another optimal IAB-donor or IAB node.

The core use case of the mobile IAB is a wireless data service in a train or a bus. In order to provide a wireless data service to a large number of users on board a fast-moving train, a mobile IAB node may be installed in the carriage. The mobile IAB node is wirelessly connected to the IAB-donor 310 located outside the carriage or other IAB nodes. Since the mobile IAB node moves, it is necessary to change the wirelessly connected IAB-donor or IAB node to an optimal one. In this case, a question arises as to whether all UEs in the carriage with the mobile IAB node installed therein may perform handover. Since the UEs are connected to the mobile IAB node as the UEs are, there is no need to adjust an uplink transmission timing when the mobile IAB node is connected to another IAB-donor or IAB node.

However, since the IAB-donor or IAB node connected to the mobile IAB node is changed, the security configuration is required to be updated. Accordingly, although a handover is required to update the security configuration as in the prior art, random access is unnecessary in the handover process. Therefore, it is inefficient to perform handover as in the prior art. In particular, due to the characteristics of the scenario, when a plurality of UEs perform handover at the same time, a plurality of random access processes may be simultaneously triggered, resulting in instantaneous network congestion.

The disclosure provides various methods for updating security configuration instead of conventional handover in a mobile IAB scenario.

Figure 4:
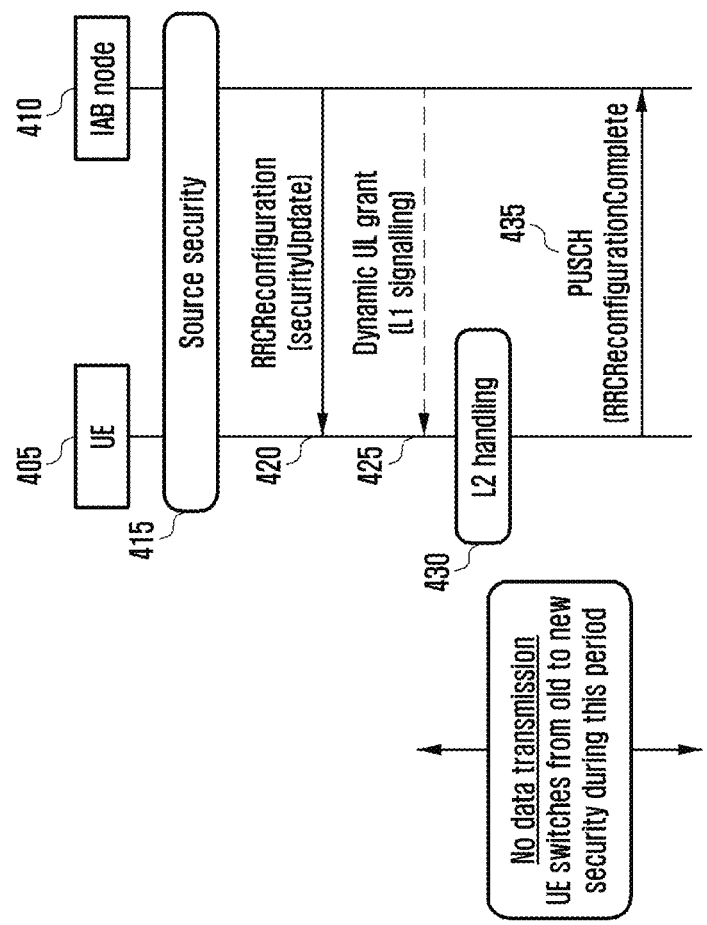
FIG. 4 is a flowchart illustrating an operation of performing security update without a random access process according to an embodiment of the present disclosure.

FIG. 4 is a flowchart illustrating an operation of performing security update without a random access process according to an embodiment of the present disclosure.

A base station 410 in FIG. 4 may include an IAB node.

In 415, the base station 410 may perform a security process on each packet in a data transmission/reception process with a UE 405 and may recognize that security configuration need to be updated in certain cases. For example, when security configuration information such as an IAB security algorithm is changed as a base station (e.g., a mobile IAB node) moves, or when a running counter is wrapped around, it may be determined that the security configuration needs to be updated.

For example, the mobile IAB node 410 is connected to one donor IAB node 440 via several IAB nodes or directly through a wireless backhaul link. When the mobile IAB node moves and is difficult to be connected with the donor IAB node any longer, a connection to another adjacent donor IAB node may be changed. Whether to change the connection may be determined through various methods.

As an example, the mobile IAB node may report, to the connected donor IAB node, signal strength information collected through a reference signal provided from the IAB node connected to the mobile IAB node or the donor IAB node in 445, and based on this information, the donor IAB node may determine a connection to the mobile IAB node. When it is determined that it is difficult for the donor IAB node to be connected to the mobile IAB node directly or via another IAB node connected to the donor IAB node, the donor IAB node may request a connection procedure with the mobile IAB node from the adjacent donor IAB node connectable to the mobile IAB node.

In this case, the donor IAB node may require a coordination procedure with the adjacent donor IAB node in advance for movement (i.e., handover) of the connection. At this time, when the donor IAB node is changed, it is regarded as the same as the case in which the CU is changed in a CU-DU structure, and predetermined configuration information such as security configuration for UEs connected to the mobile IAB node may be updated. In 450, the new security configuration may be provided by the currently connected donor IAB node, and the donor IAB node may provide the new security configuration information to the mobile IAB node via another IAB node or directly. The new security configuration information may be provided together when the mobile IAB node receives configuration information necessary for a connection with the adjacent donor IAB node from the currently connected donor IAB node. The new security configuration information is transmitted, by the mobile IAB node, to a UE corresponding to the security configuration information.

In 420, the base station may configure an operation of updating security information without a random access process using a predetermined RRC message (e.g., an RRC reconfiguration message). The RRC message may include new security configuration information together with an indicator indicating to update security information without the random access process. The security configuration information refers to ciphering algorithm and integrity protection algorithm information, and a ciphering algorithm and integrity protection algorithm applied to a signaling radio bearer (SRB) and a data radio bearer (DRB) are determined through the security configuration information. The UE receiving the information newly derives security keys necessary for ciphering or integrity protection of the SRB and DRB.

The ciphering refers to an operation of encrypting data to prevent others from decoding data, and integrity protection refers to an operation of encrypting data to determine whether others have arbitrarily modified data. The UE receiving the RRC message performs the above-described L2 related operations in 430, and stops the data transmission/reception operation with the base station until a control message (e.g., an RRC reconfiguration complete message) to which the new security configuration information is applied starting from the following predetermined time point is transmitted to the base station in 435 by using a predetermined uplink or downlink wireless resource to apply the new security configuration, or before predetermining signaling is received from the base station. The predetermined time point may be defined as follows.

In one embodiment of a first option, a time point of receiving a PDCCH including the first UL grant or DL assignment (scheduling information for uplink or downlink radio resource) that arrives after receiving a predetermined RRC message configuring an operation of updating security information without a random access procedure in 420, or after a predetermined time (subframe/slot/symbol units) after receiving a predetermined RRC message for configuring an operation of updating security information without a random access process, or a time point of receiving a PDCCH including the first UL grant or DL assignment that arrives after a predetermined timer expires. The predetermined time may be predetermined or configured (e.g., may be configured by the RRC message) by the base station. In 435, the UE may transmit a PUSCH or receive a PDSCH in an uplink radio resource indicated by the UL grant or a downlink radio resource indicated by the DL assignment. New security configuration information updated from the PUSCH or the PDSCH may be applied. The PUSCH may include a predetermined message (e.g., an RRC reconfiguration complete message).

In one embodiment of a second option, a time point in which the base station receives a PDCCH including predetermined L1 signaling 425 after receiving a predetermined RRC message for configuring an operation of updating security information without a random access process in 420. The PDCCH including the L1 signaling may also include UL grant or DL assignment. In this case, in 435, the UE may transmit the PUSCH or receive the PDSCH in the uplink radio resource indicated by the UL grant or the downlink radio resource indicated by the DL assignment. New security configuration information updated from the PUSCH or PDSCH may be applied. The PUSCH may include a predetermined message (e.g., an RRC reconfiguration complete message).

In the embodiment, it is characterized that it is possible to designate a time point when the network applies the updated new security configuration. As for the time point, the time required for the UE to perform the L2-related operation and apply the new security configuration may be considered.

Figure 5:
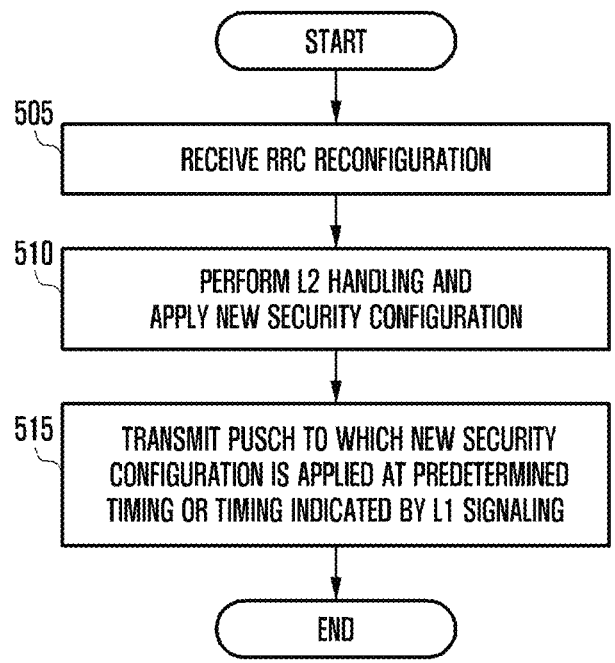
FIG. 5 is a flowchart illustrating a UE operation of performing security update without a random access process according to an embodiment of the present disclosure.

FIG. 5 is a flowchart illustrating a UE operation of performing security update without a random access process according to an embodiment of the present disclosure based on FIG. 4.

In operation 505, a UE receives a predetermined RRC message (e.g., an RRC reconfiguration message) from a base station (e.g., IAB node). The RRC message may include security reconfiguration information together with an indicator indicating to update security information without the random access process. In addition, the RRC message may include information related to a time point when new security configuration is applied.

In operation 510, after receiving a PDCCH including the UL grant or DL assignment at a predetermined time point, the UE may stop transmitting/receiving data with the base station, may perform an operation related to L2, and may apply the new security configuration.

In operation 515, the UE may transmit a PUSCH to which the new security configuration is applied or receive a PDSCH in an uplink radio resource indicated by the UL grant or a downlink radio resource indicated by the DL assignment. An RRC reconfiguration complete message for the RRC message including the security reconfiguration information may be included in the PUSCH and may be transmitted by the UE.

Figure 6:
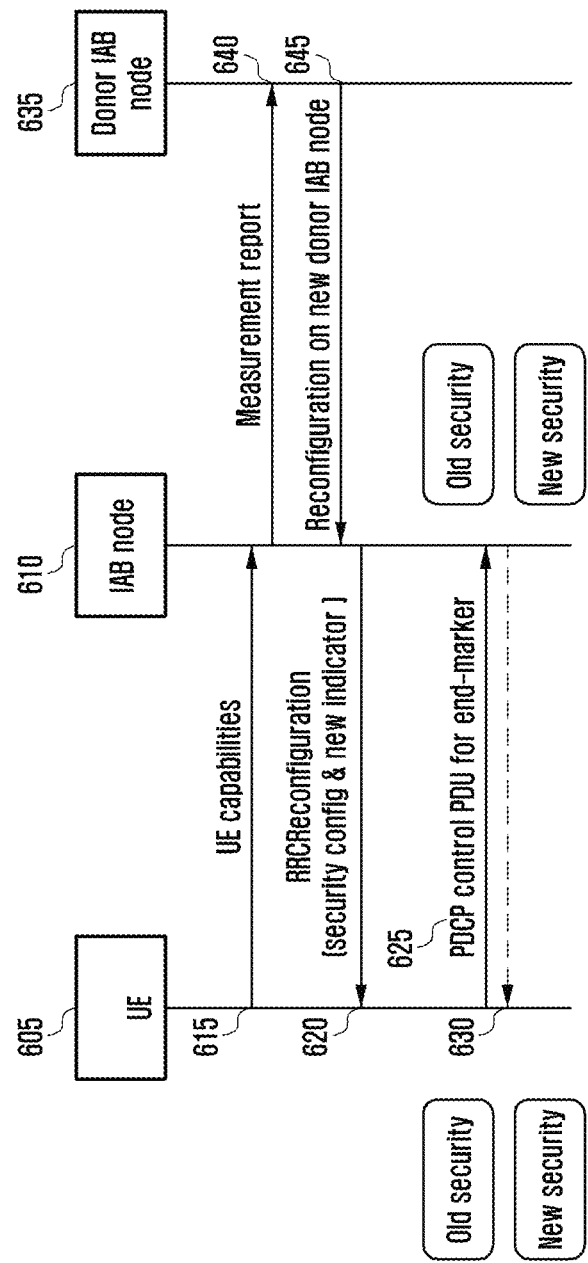
FIG. 6 is a flowchart illustrating an operation of performing security update using a PDCP control packet according to an embodiment of the present disclosure.

FIG. 6 is a flowchart illustrating an operation of performing security update using a PDCP control packet according to an embodiment of the present disclosure.

A base station 610 in FIG. 6 may include a mobile IAB node.

In 615, a UE 605 reports its capability information to the base station 610. The capability information may include an indicator indicating that security configuration can be updated without a handover operation.

The mobile IAB node 610 is connected to one donor IAB node 635 via several IAB nodes or directly through a wireless backhaul link. When the mobile IAB node moves and is difficult to be connected with the donor IAB node any longer, a connection to another adjacent donor IAB node may be changed. Whether to change the connection may be determined through various methods. For example, the mobile IAB node may report, to the connected donor IAB node, signal strength information collected through a reference signal provided from the IAB node connected to the mobile IAB node or the donor IAB node in 640, and based on this information, the donor IAB node may determine a connection to the mobile IAB node.

When it is determined that it is difficult for the donor IAB node to be connected to the mobile IAB node directly or via another IAB node connected to the donor IAB node, the donor IAB node may request a connection procedure with the mobile IAB node from the adjacent IAB node connectable to the mobile IAB node. In this case, the donor IAB node may require a coordination procedure with the adjacent donor IAB node in advance for movement (i.e., handover) of the connection.

At this time, when the donor IAB node is changed, it is regarded as the same as the case in which the CU is changed in a CU-DU structure, and predetermined configuration information such as security configuration for UEs connected to the mobile IAB node may be updated. In 645, the new security configuration may be provided by the currently connected donor IAB node, and the donor IAB node may provide the new security configuration information to the mobile IAB node via another IAB node or directly. The new security configuration information may be provided together when the mobile IAB node receives configuration information necessary for a connection with the adjacent donor IAB node from the currently connected donor IAB node. The new security configuration information is transmitted, by the mobile IAB node, to a UE corresponding to the security configuration information.

In 620, the base station may transmit, to the UE, a predetermined RRC message including an indicator indicating a corresponding operation in the embodiment together with security reconfiguration information. The security reconfiguration information refers to ciphering algorithm and integrity protection algorithm information, and a ciphering algorithm and integrity protection algorithm applied to the SRB and DRB are determined through the security reconfiguration information. The UE receiving the information newly derives security keys necessary for ciphering or integrity protection of the SRB and DRB. In 625, the UE receiving the RRC message may transmit a newly defined PDCP control packet (e.g., a PDCP control PDU) indicating that the newly defined PDCP control packet is the last PDCP packet data unit (PDU) to which the conventional security configuration is applied, or a predetermined indicator indicating the last PDCP PDU to which the conventional security configuration is applied may be included in the PDCP PDU header and may be transmitted to the last PDCP PDU.

After transmission/reception of the new PDCP control PDU or after transmission/reception of the PDCP PDU including the indicator, the UE and the base station consider that the new security configuration is applied to the transmitted/received data. The base station receives the PDCP control PDU or the indicator applies the new security configuration to process subsequent data. On the other hand, the new PDCP control PDU or the PDCP PDU including the indicator may be processed as having applied the conventional security configuration thereto.

In 630, the base station may also transmit the newly defined PDCP control packet (e.g., the PDCP control PDU) indicating that the newly defined PDCP control packet is the last PDCP PDU to which the conventional security configuration is applied, or may allow a predetermined indicator indicating the last PDCP PDU to be included in the last PDCP PDU to which the conventional security configuration is applied and transmit the last PDCP PDU to a downlink. In this case, the UE needs to be ready to receive the new security configuration from the base station before receiving the PDCP control PDU or the indicator and apply the new security configuration. The UE receives the PDCP control PDU or the indicator applies the new security configuration to process subsequent transmission/reception data.

(a), (b), and (c) of FIG. 7 are diagrams illustrating the format of a PDCP control packet according to an embodiment of the present disclosure.

FIG. 7 (a) shows an example of a format of a PDCP control PDU serving as a new end-marker. The PDCP control PDU may be constituted of a D/C field and a PDU type field. D/C indicates whether the corresponding PDCP PDU is a PDCP data PDU or a PDCP control PDU. The PDU type field may be used to indicate the type of corresponding control information when the corresponding PDCP PDU is a PDCP control PDU. According to an embodiment of the disclosure, a new PDU type indicating a PDCP control PDU serving as a new end-marker may be defined. That is, one reserved code point (e.g., 011) may be used for the purpose of the end-marker. Table 1 below shows examples of PDU types.

TABLE 1

| Bit | Description |
| --- | --- |
| 000 | PDCP status report |
| 001 | Interspersed ROHC feedback |
| 010 | EHC feedback |
| 011 | End marker for security update |
| 100-111 | Reserved |

As another method, a predetermined indicator indicating the last PDCP PDU in which the conventional security configuration is applied to the PDCP PDU may be included in a PDCP PDU header.

There are several formats for the PDCP data PDU. For example, FIG. 7 (b) shows a PDCP data PDU used to transmit a signaling radio bearer (SRB), and FIG. 7 (c) shows a PDCP data PDU used to transmit a data radio bearer (DRB). Reserved fields exist in the header part of the PDCP data PDU. One (S) 710 or 715 of these fields may be used for the corresponding PDCP PDU to include information indicating that the PDCP PDU is the last PDCP PDU to which the conventional security configuration is applied.

Figure 8:
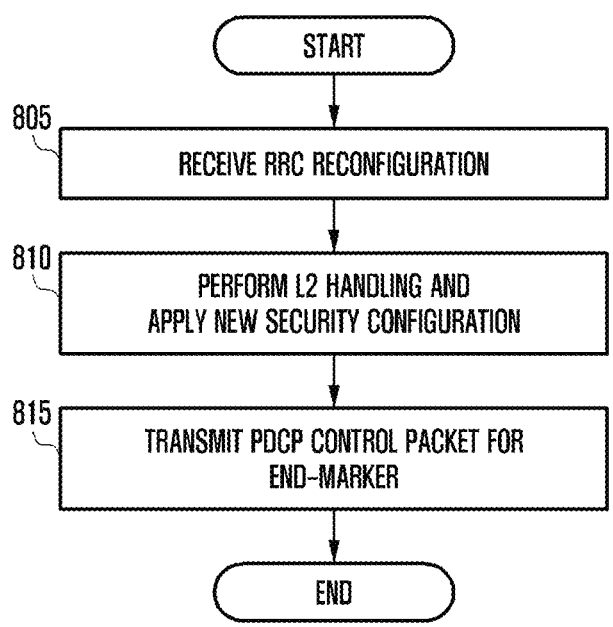
FIG. 8 is a flowchart illustrating a UE operation of performing security update using a PDCP control packet according to an embodiment of the present disclosure.

FIG. 8 is a flowchart illustrating a UE operation of performing security update using a PDCP control packet according to an embodiment of the present disclosure based on FIG. 6.

In operation 805, a UE may receive, from a base station (e.g., an IAB node), a predetermined RRC message (e.g., an RRC reestablishment message) including an indicator indicating PDCP reestablishment for security reconfiguration together with security reconfiguration information.

In operation 810, after receiving the RRC message, the UE performs an operation related to the L2 described above, and prepares to apply new security configuration.

In operation 815, the UE may transmit a newly defined PDCP control packet (e.g., a PDCP control PDU) indicating that the newly defined PDCP control packet is the last PDCP PDU to which the conventional security configuration is applied, or a predetermined indicator indicating the last PDCP PDU to which the conventional security configuration is applied may be included in the PDCP PDU header and may be transmitted to the last PDCP PDU. The L2-related operation may be completed before the PDCP control PDU or the PDCP PDU including the indicator is transmitted.

Figure 9:
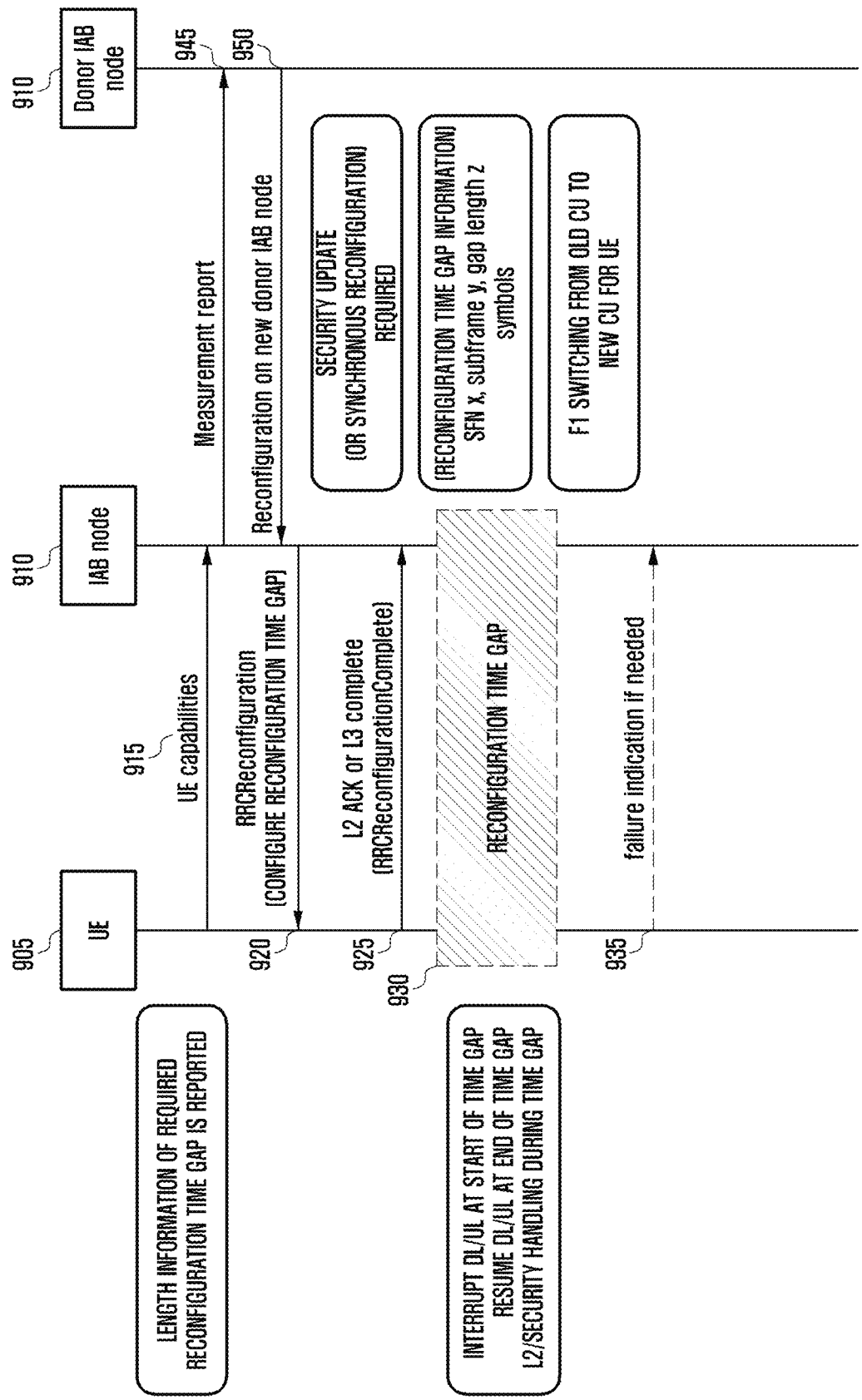
FIG. 9 is a flowchart illustrating an operation of performing security update during a predetermined time gap according to an embodiment of the present disclosure.

FIG. 9 is a flowchart illustrating an operation of performing security update during a predetermined time gap according to an embodiment of the present disclosure. A base station 910 in FIG. 9 may include a mobile IAB node.

In 915, a UE 905 may report its capability information to the base station 910. The capability information may include an indicator indicating whether a time gap for reconfiguration is supported and information on the length of a time gap required for the UE for reconfiguration. The reconfiguration may include the above-described L2-related operation and/or security reconfiguration operation. The UE and the base station consider that new security configuration is applied after the time gap has elapsed.

Accordingly, there is no need to transmit and receive an indicator indicating that the new security configuration has been applied or a control message between the UE and the base station. The mobile IAB node 910 is connected to one donor IAB node 940 via several IAB nodes or via a wireless backhaul link directly. When the mobile IAB node moves and is difficult to be connected with the donor IAB node any longer, a connection to another adjacent donor IAB node may be changed. Whether to change the connection may be determined through various methods.

For example, the mobile IAB node may report, to the connected donor IAB node, signal strength information collected through a reference signal provided from the IAB node connected to the mobile IAB node or the donor IAB node in 945, and based on this information, the donor IAB node may determine a connection to the mobile IAB node. When it is determined that it is difficult for the donor IAB node to be connected to the mobile IAB node directly or via another IAB node connected to the donor IAB node, the donor IAB node may request a connection procedure with the mobile IAB node from the adjacent IAB node connectable to the mobile IAB node.

In this case, the donor IAB node may require a coordination procedure with the adjacent donor IAB node in advance for movement (i.e., handover) of the connection. At this time, when the donor IAB node is changed, it is regarded as the same as the case in which the CU is changed in a CU-DU structure, and predetermined configuration information such as security configuration for UEs connected to the mobile IAB node may be updated. In 950, the new security configuration may be provided by the currently connected donor IAB node, and the donor IAB node may provide the new security configuration information to the mobile IAB node via another IAB node or directly. The new security configuration information may be provided together when the mobile IAB node receives configuration information necessary for a connection with the adjacent donor IAB node from the currently connected donor IAB node. The new security configuration information is transmitted, by the mobile IAB node, to a UE corresponding to the security configuration information.

When the base station determines that security reconfiguration (update) is necessary, the base station may transmit a predetermined RRC message (e.g., an RRC reconfiguration message) including security reconfiguration information and predetermined time gap information to the UE in 920.

The time gag information may indicate the time gap in various ways. For example, the time gap may be indicated based on a system frame number (SFN) or absolute time information (e.g., UTC). The SFN at which the time gap starts and frame/sub-frame information, and the length of the time gap may be configured in units of frame, sub-frame, slot, symbol, or the like. Alternatively, the start time and length of the time gap may be displayed as absolute time.

As another method, it may be defined that the time gap starts after a predetermined time after receiving the RRC message or after the UE transmits a response signaling to the RRC message in 925.

In 925, the UE receiving the RRC message may transmit an L2 message (e.g., an L2 Acknowledge message) or an L3 message (e.g., an RRC reconfiguration complete message) to the base station in response to the reception of the RRC message. During the time gap indicated by the time gap information, the UE may stop the data transmission/reception operation, may perform the L2-related operation, and may apply a new security configuration in 930. During the time gap, the IAB node that is the base station may switch an F1 interface from an old CU to a new CU. That is, the IAB-donor or IAB node connected to the mobile IAB node may be changed. After the time gap ends, the new security configuration is applied to transmitted/received data and the transmitted/received data is processed. When the UE fails to configure new security for a predetermined reason during the time gap, signaling indicating the failure may be transmitted to the base station in 935. In this case, as the signaling, L1 signaling that is not affected by security configuration may be used.

When the security configuration is updated based on the time gap as in the embodiment of the disclosure, the UE performs the L2-related operation for a predetermined time and is guaranteed a time to prepare to apply the new security configuration. In addition, since the UE and the base station promise that the new security configuration is applied after a predetermined time gap, there is no need for signaling indicating whether a separate new security configuration has been applied.

Figure 10:
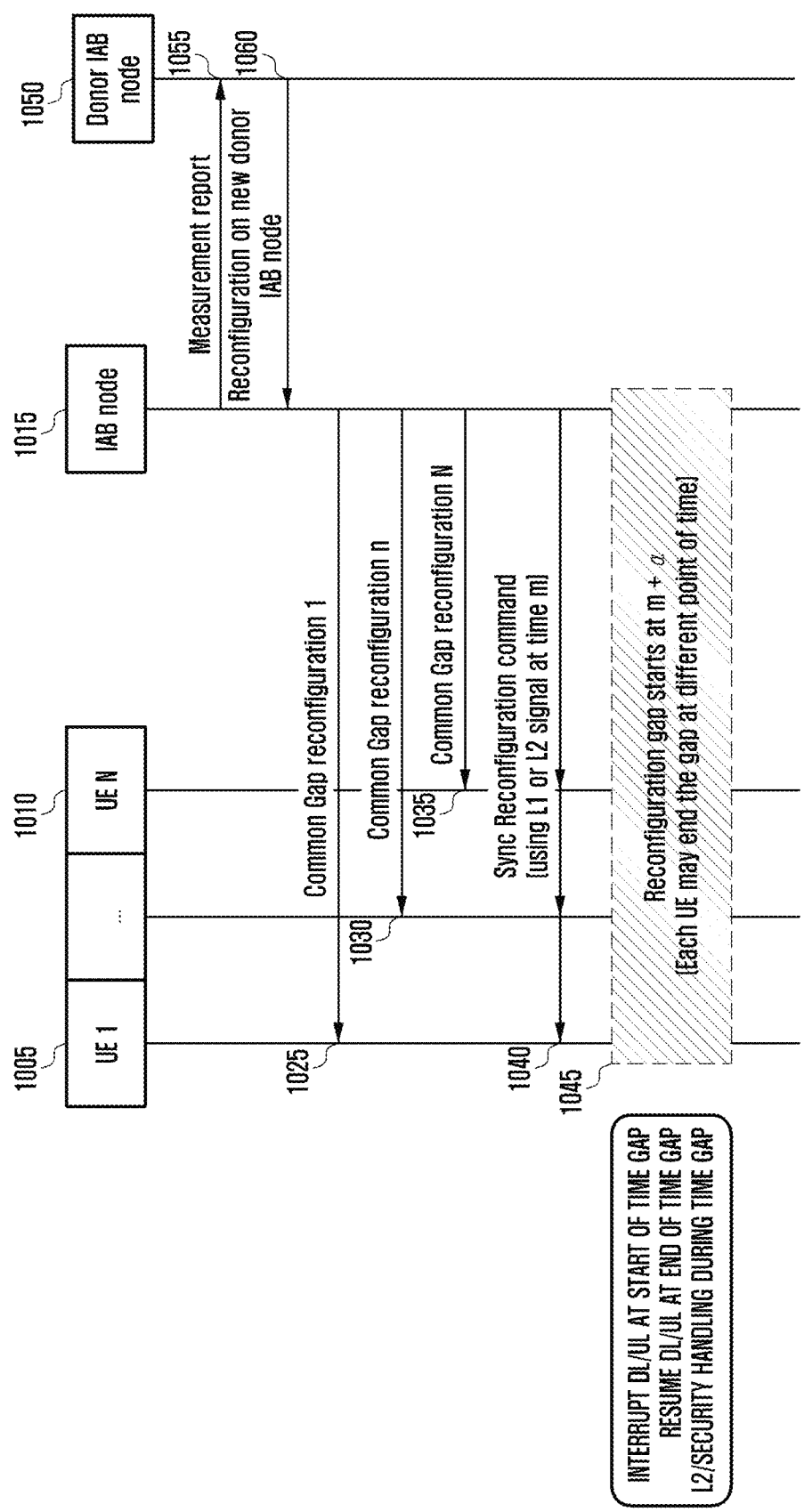
FIG. 10 is a flowchart illustrating an operation of performing security update during a predetermined common time gap according to an embodiment of the present disclosure.

FIG. 10 is a flowchart illustrating an operation of performing security update during a predetermined common time gap according to an embodiment of the present disclosure based on FIG. 9. A base station 1015 in FIG. 10 may include a mobile IAB node.

In a mobile IAB scenario, UEs receiving services from the mobile IAB node need to update security configuration at a similar time point. Transmitting RRC messages instructing all UEs to perform security reconfiguration at a time point of actually updating the security configuration may cause a kind of congestion. Accordingly, it will be advantageous to alleviate network congestion by providing the security configuration information to the UEs in advance and performing security configuration update provided in advance when the security configuration is actually updated. This embodiment provides a method of transmitting L1 signaling indicating that a predetermined common time gap starts to a plurality of UEs when the time to update the security configuration comes. The L1 signaling is transmitted to the UE through the PDCCH. The mobile IAB node 1015 is connected to one donor IAB node 1050 via several IAB nodes or via a wireless backhaul link directly.

When the mobile IAB node moves and is difficult to be connected with the donor IAB node any longer, a connection to another adjacent donor IAB node may be changed. Whether to change the connection may be determined through various methods. For example, the mobile IAB node may report, to the connected donor IAB node, signal strength information collected through a reference signal provided from the IAB node connected to the mobile IAB node or the donor IAB node in 1055, and based on this information, the donor IAB node may determine a connection to the mobile IAB node. When it is determined that it is difficult for the donor IAB node to be connected to the mobile IAB node directly or via another IAB node connected to the donor IAB node, the donor IAB node may request a connection procedure with the mobile IAB node from the adjacent IAB node connectable to the mobile IAB node.

In this case, the donor IAB node may require a coordination procedure with the adjacent donor IAB node in advance for movement (i.e., handover) of the connection. At this time, when the donor IAB node is changed, it is regarded as the same as the case in which the CU is changed in a CU-DU structure, and predetermined configuration information such as security configuration for UEs connected to the mobile IAB node may be updated. In 1060, the new security configuration may be provided by the currently connected donor IAB node, and the donor IAB node may provide the new security configuration information to the mobile IAB node via another IAB node or directly. The new security configuration information may be provided together when the mobile IAB node receives configuration information necessary for a connection with the adjacent donor IAB node from the currently connected donor IAB node. The new security configuration information is transmitted, by the mobile IAB node, to a UE corresponding to the security configuration information.

In 1025, 1030, and 1035, the base station 1015 may configure new security configuration information and common time gap information to a plurality of UEs 1005 and 1010, respectively. The security configuration information refers to ciphering algorithm and integrity protection algorithm information, and a ciphering algorithm and integrity protection algorithm applied to an SRB and DRB are determined through the security configuration information. The UE newly derives security keys necessary for ciphering or integrity protection of the SRB and DRB.

In this case, the configuration may be performed with respect to each of the UEs 1005 and 1010 at the same time, or the configuration may be performed individually at different time points. The common time gap information may include length information of the time gap, and the like. Scheduling information of the L1 signaling for triggering the common time gap may also be provided to each UE together with the information. The UEs having received the scheduling information of the L1 signaling need to monitor whether the L1 signaling is transmitted on a predetermined occasion according to the scheduling information.

The base station may transmit the L1 signaling for triggering the common time gap to the plurality of UEs in 1040. When all UEs can receive the L1 signaling together, signaling overhead can be greatly reduced. Accordingly, when the common time gap information is provided, common search space (CSS) information for receiving the signaling and separate radio network temporary identifier (RNTI) information indicating the L1 signaling may be provided. All the UEs having received the signaling trigger the common time gap immediately or after a predetermined time has elapsed. The predetermined time may be predetermined in unit of a subframe, a slot, or a symbol, or may be configured by the base station.

In 1045, all the UEs stop the data transmission/reception operation during the common time gap, may perform the L2-related operation, and may apply new security configuration. During the common time gap, the IAB node may switch an F1 interface from an old CU to a new CU. That is, it is possible to change the IAB-donor or IAB node connected to the mobile IAB node. After the common time gap ends, the transmission/reception data is processed by applying a new security configuration to the transmission/reception data.

Figure 11:
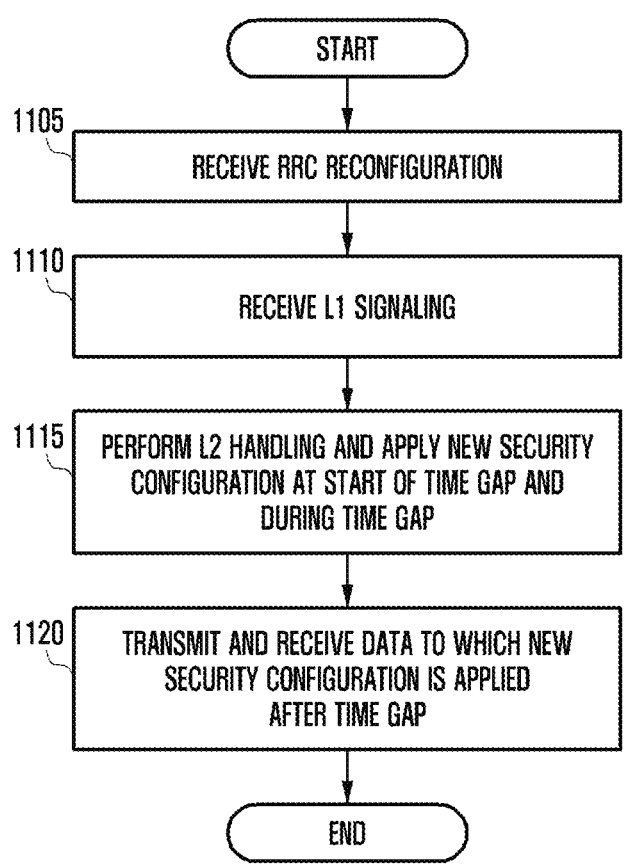
FIG. 11 is a flowchart illustrating a UE operation of performing security update during a predetermined time gap according to an embodiment of the present disclosure.

FIG. 11 is a flowchart illustrating a UE operation of performing security update during a predetermined time gap according to an embodiment of the present disclosure based on FIG. 10.

In operation 1105, a UE may receive a predetermined RRC message (e.g., an RRC reconfiguration message) from a base station (e.g., an IAB node). The RRC message may include new security configuration information and common time gap information. In addition, CSS information for receiving predetermined signaling indicating that the gap starts and separate RNTI information indicating the L1 signaling may be provided together with common time gap information through the RRC message.

In operation 1110, the UE receives predetermined signaling indicating that the gap starts.

In operation 1115, after receiving the predetermined signaling, the UE performs the above-described L2-related operation immediately or starting from a time point when a predetermined time has elapsed, and prepares to transmit/receive data by applying the new security configuration.

In operation 1120, after the time gap ends, the UE processes transmitted and received data according to the new security configuration.

Figure 12:
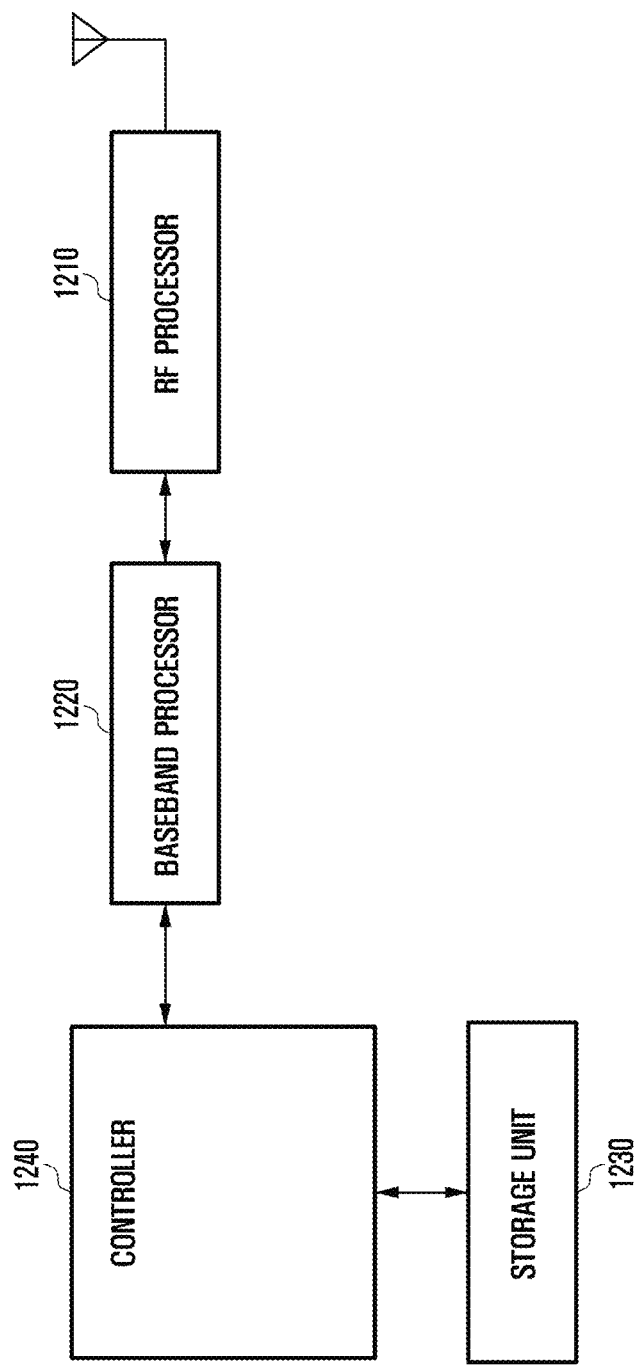
FIG. 12 is a block diagram illustrating an internal structure of a UE according to an embodiment of the present disclosure.

FIG. 12 is a block diagram illustrating an internal structure of a UE according to an embodiment of the present disclosure.

Referring to FIG. 12, the UE includes a radio frequency (RF) processor 1210, a baseband processor 1220, a storage unit 1230, and a controller 1240.

The RF processor 1210 performs a function for transmitting and receiving a signal through a wireless channel, such as band conversion and amplification of the signal. That is, the RF processor 1210 up-converts a baseband signal provided from the baseband processor 1220 into an RF band signal, transmits the RF band signal through an antenna, and down-converts the RF band signal received through the antenna to a baseband signal. For example, the RF processor 1210 may include a transmission filter, a reception filter, an amplifier, a mixer, an oscillator, a digital to analog converter (DAC), an analog to digital converter (ADC), etc.

In FIG. 12, only one antenna is shown, but the UE may include a plurality of antennas. In addition, the RF processor 1210 may include a plurality of RF chains. Furthermore, the RF processor 1210 may perform beamforming. For the beamforming, the RF processor 1210 may adjust the phase and magnitude of each of signals transmitted and received through the plurality of antennas or antenna elements. In addition, the RF processor may perform MIMO, and may receive multiple layers when performing the MIMO operation.

The baseband processor 1220 performs a function of converting between a baseband signal and a bit stream according to a physical layer standard of the system. For example, at the time of transmitting data, the baseband processor 1220 generates complex symbols by encoding and modulating a transmission bit stream. In addition, at the time of receiving data, the baseband processor 1220 restores a received bit stream by demodulating and decoding a baseband signal provided from the RF processor 1210. For example, upon data transmission according to an orthogonal frequency division multiplexing (OFDM) scheme, the baseband processor 1220 generates complex symbols by encoding and modulating a transmission bit stream, mapping the complex symbols to subcarriers, and then configures OFDM symbols through am inverse fast Fourier transform (IFFT) operation and cyclic prefix (CP) insertion.

In addition, upon data reception, the baseband processor 1220 divides the baseband signal provided from the RF processor 1210 into OFDM symbol units, restores the signals mapped to the subcarriers through a fast Fourier transform (FFT) operation, and then restores a reception beat stream through demodulation and decoding.

The baseband processor 1220 and the RF processor 1210 transmit and receive signals as described above. Accordingly, the baseband processor 1220 and the RF processor 1210 may be referred to as a transmitter, a receiver, a transceiver, or a communication unit. Furthermore, at least one of the baseband processor 1220 and the RF processor 1210 may include a plurality of communication modules to support a plurality of different wireless access technologies. In addition, at least one of the baseband processor 1220 and the RF processor 1210 may include different communication modules to process signals of different frequency bands. For example, the different wireless access technologies may include a wireless LAN (e.g., IEEE 802.11), a cellular network (e.g., an NR), and the like. In addition, the different frequency bands may include a super high frequency (SHF) (e.g., 20 GHz) band and a millimeter wave (e.g., 60 GHz) band.

The storage unit 1230 stores data such as a basic program, an application program, and configuration information for the operation of the UE. In addition, the storage unit 1230 provides stored data according to the request of the controller 1240.

The controller 1240 controls overall operations of the UE. For example, the controller 1240 transmits and receives signals through the baseband processor 1220 and the RF processor 1210. In addition, the controller 1240 writes and reads data in the storage unit 1240.

In addition, the controller 1240 may control the operation of the UE according to various embodiments of the disclosure described above. To this end, the controller 1240 may include at least one processor. For example, the controller 1240 may include a communication processor (CP) that performs control for communication and an application processor (AP) that controls an upper layer such as an application program.

The controller 1240 according to an embodiment of the disclosure may perform security processing based on security configuration related to a packet data convergence protocol (PDCP) layer when transmitting and receiving data with an IAB node, and may update security configuration for the PDCP layer based on the security configuration information when a first control message including the security configuration information is received from the IAB node. Next, based on the updated security configuration, a security processing may be performed on data transmitted and received to and from the IAB node.

According to an embodiment, the first control message may further include an indicator instructing security configuration update.

The controller 1240 transmits, to the IAB node, a second control message in which security processing is performed based on the updated security configuration in an uplink resource indicated by scheduling information transmitted after transmitting the first control message. After the scheduling information is received, the transmission of the data on which security processing is performed based on the security configuration before updating may be stopped.

According to an embodiment, the first control message may further include an indicator indicating PDCP reestablishment.

The controller 1240 may control to transmit or receive, to or from the IAB node, a control packet or data packet including an indicator indicating that the control packet or the data packet is the last packet on which security processing is performed based on the security configuration before the updating.

According to an embodiment, the first control message may further include information about a reconfiguration time gap.

The controller 1240 may update security configuration for the PDCP layer based on the security configuration information during the reconfiguration time gap, and may transmit and receive the data on which security processing is performed based on the updated security configuration after the reconfiguration time gap ends.

According to an embodiment, the first control message may further include information on a common search space area and information on a radio network temporary identifier (RNTI).

The controller 1240 may receive a signal triggering the reconfiguration time gap based on the information on common search space area and the information on RNTI.

Figure 13:
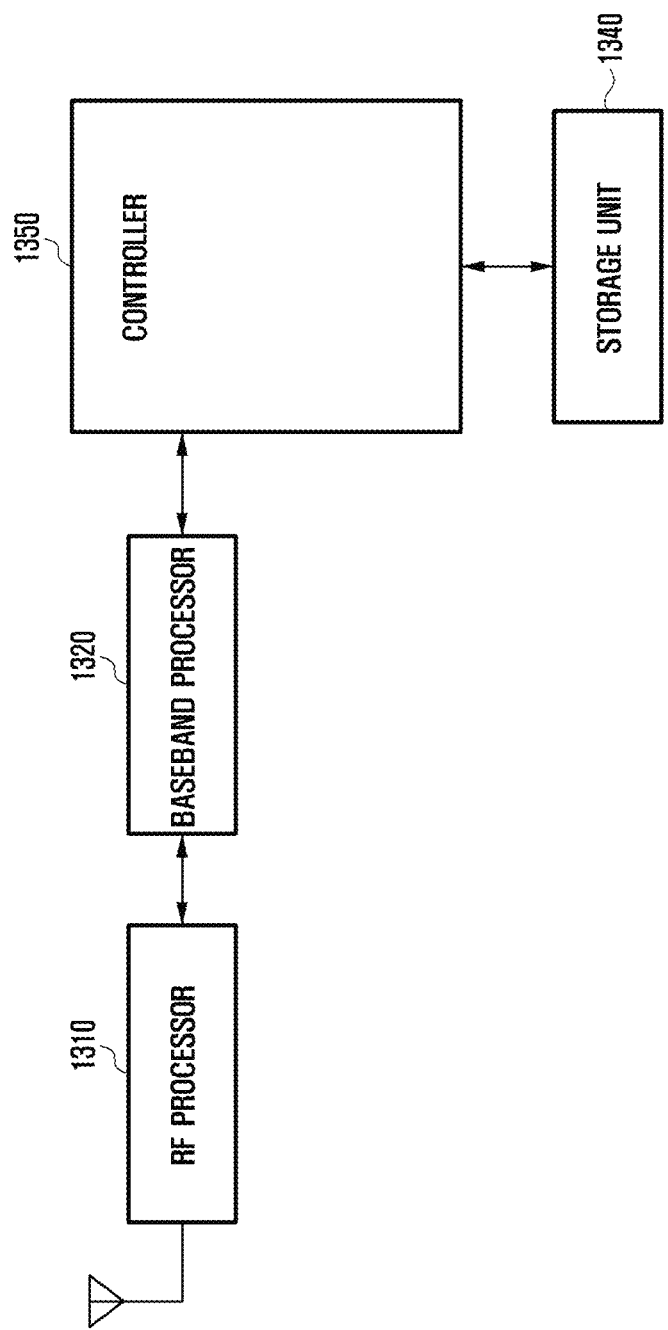
FIG. 13 is a block diagram illustrating a configuration of a base station according to the present disclosure.

FIG. 13 is a block diagram illustrating a configuration of a base station (e.g., an IAB node) according to the present disclosure.

As shown in FIG. 13, the base station is configured to include an RF processor 1310, a baseband processor 1320, a storage unit 1340, and a controller 1350.

The RF processor 1310 performs a function for transmitting and receiving a signal through a wireless channel, such as band conversion and amplification of the signal. That is, the RF processor 1310 up-converts a baseband signal provided from the baseband processor 1320 into an RF band signal, transmits the RF band signal through an antenna, and down-converts the RF band signal received through the antenna to a baseband signal. For example, the RF processor 1310 may include a transmission filter, a reception filter, an amplifier, a mixer, an oscillator, a DAC, an ADC, and the like.

In FIG. 13, only one antenna is shown, but the base station may have a plurality of antennas. In addition, the RF processor 1310 may include a plurality of RF chains. Furthermore, the RF processor 1310 may perform beamforming. For the beamforming, the RF processor 1310 may adjust the phase and magnitude of each of signals transmitted and received through a plurality of antennas or antenna elements. The RF processor may perform a downlink MIMO operation by transmitting one or more layers.

The baseband processor 1320 performs a conversion function between a baseband signal and a bit stream according to a physical layer standard of a radio access technology. For example, at the time of transmitting data, the baseband processor 1320 generates complex symbols by encoding and modulating a transmission bit stream. In addition, at the time of receiving data, the baseband processor 1320 restores a reception bit stream by demodulating and decoding the baseband signal provided from the RF processor 1310.

For example, according to the OFDM scheme, when data is transmitted, the baseband processor 1320 generates complex symbols by encoding and modulating the transmission bit stream, maps the complex symbols to subcarriers, and configure OFDM symbols through an IFFT operation and CP insertion.

In addition, upon data reception, the baseband processor 1320 divides the baseband signal provided from the RF processor 1310 into OFDM symbol units, restores the signals mapped to the subcarriers through an FFT operation, and then restores the reception bit stream through demodulation and decoding. The baseband processor 1320 and the RF processor 1310 transmit and receive signals as described above. Accordingly, the baseband processor 1320 and the RF processor 1310 may be referred to as a transmitter, a receiver, a transceiver, a communication unit, or a wireless communication unit.

The storage unit 1340 stores data such as a basic program, an application program, and configuration information for the operation of the base station. In particular, the storage unit 1340 may store information on a bearer allocated to a connected UE, a measurement result reported from the connected UE, and the like. In addition, the storage unit 1340 may store information serving as a criterion for determining whether to provide or stop multiple connections to the UE. In addition, the storage unit 1340 provides stored data according to the request of the controller 1350.

The controller 1350 controls overall operations of the base station. For example, the controller 1350 transmits and receives signals through the baseband processor 1320 and the RF processor 1310. In addition, the controller 1350 writes and reads data in the storage unit 1340. In addition, the controller 1350 may control the operation of the base station according to various embodiments of the disclosure described above. To this end, the controller 1350 may include at least one processor.

The controller 1350 according to an embodiment of the disclosure may control to transmit/receive security-processed data to and from the UE based on the security configuration related to a packet data convergence protocol (PDCP) layer, to transmit a first control message including security configuration information to the UE, and to transmit/receive the security-processed data to and from the UE using the updated security configuration based on the security configuration information.

According to an embodiment, the first control message may further include an indicator instructing security configuration update.

The controller 1350 transmits, from the UE, a second control message in which security processing is performed based on the updated security configuration, in an uplink resource indicated by scheduling information transmitted after transmitting the first control message. After receiving the scheduling information, the transmission of the data on which security processing is performed based on the security configuration before the updating may be stopped.

According to an embodiment, the first control message may further include an indicator indicating PDCP reestablishment.

The controller 1350 may receive or transmit, from or to the UE, a control packet or data packet including an indicator indicating that the control packet or the data packet is the last packet on which security processing is performed based on the security configuration before the updating.

According to an embodiment, the first control message may further include information about a reconfiguration time gap.

During the reconfiguration time gap, the security configuration for the PDCP layer may be updated based on the security configuration information. The controller 1350 may transmit/receive the data on which security processing is performed based on the updated security configuration after the reconfiguration time gap ends.

According to an embodiment, the first control message may further include information on a common search space area and information on a radio network temporary identifier (RNTI).

The controller 1350 may transmit a signal for triggering the reconfiguration time gap based on the information on the common search space area and the information on the RNTI.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

On the other hand, the operations provided in various embodiments of the disclosure may be combined into one sequence and performed within a range in which the operations do not interfere. That is, each of the UE and the base station (IAB node) may combine and perform at least two operations presented in the various embodiments provided above within a range in which the operations do not interfere with each other, so that the UE connected to the mobile IAB node can update the security configuration.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system supporting an integrated access and backhaul (IAB) communication, the method comprising:
    performing, based on a security configuration, a first security processing operation for a packet data convergence protocol (PDCP) layer in accordance with a communication with an IAB node, wherein the communication comprises a data transmission and a data reception with the IAB node;
    receiving, from the IAB node, a first control message including security configuration information and information associated with a reconfiguration time duration;
    within the reconfiguration time duration, updating the security configuration for the PDCP layer based on the security configuration information; and
    after the reconfiguration time duration, performing, based on the updated security configuration, a second security processing operation on the data transmission and the data reception with the IAB node.

2. The method of claim 1, wherein:
    the first control message further includes an indicator indicating to instruct security configuration update; and
    in an uplink resource indicated by scheduling information transmitted after receiving the first control message, a second control message is transmitted to the IAB node when the second security processing operation is performed based on the updated security configuration,
    wherein after performing the first security processing operation for the PDCP layer, the UE stops the data transmission/reception operation with the IAB node until the second control message to which the updated security configuration information is to be applied starting from a following predetermined time point is transmitted to the IAB node, the predetermined time point used for receiving scheduling information for uplink or downlink radio resource that arrives after receiving the first control message.

3. The method of claim 1, wherein:
    the first control message further includes an indictor indicating a PDCP reestablishment; and
    a control packet or a data packet includes an indicator indicating that the control packet or the data packet is a last packet on which the second security processing operating is performed based on the security configuration before communicating with the IAB node to transmit and receive the updated security configuration.

4. The method of claim 1, further comprising receiving a signal for triggering the reconfiguration time duration based on information on a common search space area and information on a radio network temporary identifier (RNTI),
    wherein the first control message further includes the information on the common search space area and the information on the RNTI.

5. A method of an integrated access and backhaul (IAB) node in a wireless communication system supporting an IAB communication, the method comprising:
    exchanging security-processed data with a user equipment (UE) based on a security configuration for a packet data convergence protocol (PDCP) layer;
    transmitting, to the UE, a first control message including security configuration information and information associated with a reconfiguration time duration; and
    exchanging the security-processed data with the UE using an updated security configuration based on the security configuration information,
    wherein the security configuration for the PDCP layer is updated based on the security configuration information within the reconfiguration time duration; and
    performing, after the reconfiguration time duration, a data reception and a data transmission on which a second security processing operation is performed based on the updated security configuration.

6. The method of claim 5, wherein:
    the first control message further includes an indicator indicating to instruct security configuration update; and
    in an uplink resource indicated by scheduling information received after transmitting first control message, a second control message is received from the UE when a second security processing operation is performed based on the updated security configuration,
    wherein after performing the first security processing operation for the PDCP layer, the UE stops the data transmission/reception operation with the IAB node until the second control message to which the updated security configuration information is to be applied starting from a following predetermined time point is transmitted to the IAB node, the predetermined time point used for receiving scheduling information for uplink or downlink radio resource that arrives after receiving the first control message.

7. The method of claim 5, wherein:
    the first control message further includes an indicator indicating a PDCP reestablishment, and
    a control packet or a data packet includes an indicator indicating that the control packet or the data packet is a last packet on which a second security processing operation is performed based on the security configuration before communicating with the UE to receive and transmit the updated security configuration.

8. The method of claim 5, further comprising transmitting a signal for triggering the reconfiguration time duration based on the information on ae common search space area and information on a radio network temporary identifier (RNTI),
wherein the first control message further includes the information on the common search space area and the information on the RNTI.

9. A UE in a wireless communication system supporting an integrated access and backhaul (IAB) communication, the UE comprising:
a transceiver; and
a processor operably connected to the transceiver, the processor configured to:
perform, based on a security configuration, a first security processing operation for a packet data convergence protocol (PDCP) layer in accordance with a communication with an IAB node,
control the transceiver to receive, from the IAB node, a first control message including security configuration information and information associated with a reconfiguration time duration,
within the reconfiguration time duration, update the security configuration for the PDCP layer based on the security configuration information, and
after the reconfiguration time duration, perform, based on the updated security configuration, a second security processing operation on a data transmission and a data reception with the IAB node.

10. The UE of claim 9, wherein:
the first control message further includes an indicator indicating to instruct security configuration update; and
in an uplink resource indicated by scheduling information transmitted after receiving the first control message, a second control message is transmitted to the IAB node when the second security processing operation is performed based on the updated security configuration,
wherein after performing the first security processing operation for the PDCP layer, the UE stops the data transmission/reception operation with the IAB node until the second control message to which the updated security configuration information is to be applied starting from a following predetermined time point is transmitted to the IAB node, the predetermined time point used for receiving scheduling information for uplink or downlink radio resource that arrives after receiving the first control message.

11. The UE of claim 9, wherein:
the first control message further includes an indicator indicating a PDCP reestablishment; and
a control packet or a data packet includes an indicator indicating that the control packet or the data packet is a last packet on which the second security processing operation is performed based on the security configuration before communicating with the IAB node to transmit and receive the updated security configuration.

12. The UE of claim 9, wherein:
the processor is further configured to receive a signal for triggering the reconfiguration time duration based on information on a common search space area and information on a radio network temporary identifier (RNTI); and
the first control message further includes the information on the common search space area and the information on the RNTI.

13. An integrated access and backhaul (IAB) node in a wireless communication system supporting an IAB communication, the IAB node comprising:
a transceiver; and
a processor operably connected to the transceiver, the processor configured to:
control the transceiver to exchange security-processed data with a user equipment (UE) based on a security configuration for a packet data convergence protocol (PDCP) layer,
control the transceiver to transmit, to the UE, a first control message including security configuration information and information associated with a reconfiguration time duration, and
exchange the security-processed data with the UE using an updated security configuration based on the security configuration information,
wherein the security configuration for the PDCP layer is updated based on the security configuration information within the reconfiguration time duration; and
perform, after the reconfiguration time duration, a data reception and a data transmission on which a second security processing operation is performed based on the updated security configuration.

14. The IAB node of claim 13, wherein:
the first control message further includes an indicator indicating to instruct security configuration update; and
in an uplink resource indicated by scheduling information received after transmitting first control message, a second control message is received from the UE when a second security processing operation is performed based on the updated security configuration,
wherein after performing the first security processing operation for the PDCP layer, the UE stops the data transmission/reception operation with the IAB node until the second control message to which the updated security configuration information is to be applied starting from a following predetermined time point is transmitted to the IAB node, the predetermined time point used for receiving scheduling information for uplink or downlink radio resource that arrives after receiving the first control message.

15. The IAB node of claim 13, wherein:
the first control message further includes an indicator indicating a PDCP reestablishment; and
a control packet or a data packet includes an indicator indicating that the control packet or the data packet is a last packet on which a second security processing operation is performed based on the security configuration with the UE to receive and transmit the updated security configuration.

16. The IAB node of claim 13, wherein:
The processor is further configured to control the transceiver to transmit a signal for triggering the reconfiguration time duration based on the information on ae common search space area and information on a radio network temporary identifier (RNTI); and
the first control message further includes the information on the common search space area and the information on the RNTI.

* * * * *